United States Patent
Liu

(10) Patent No.: US 10,401,661 B2
(45) Date of Patent: Sep. 3, 2019

(54) METHOD FOR MANUFACTURING METAL WIRE AND ARRAY SUBSTRATE USING THE SAME

(71) Applicant: SHENZHEN CHINA STAR OPTOELECTRONICS SEMICONDUCTOR DISPLAY TECHNOLOGY CO., LTD., Shenzhen, Guangdong (CN)

(72) Inventor: Xiang Liu, Shenzhen (CN)

(73) Assignee: SHENZHEN CHINA STAR OPTOELECTRONICS SEMICONDUCTOR DISPLAY TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 15/575,705

(22) PCT Filed: Aug. 29, 2017

(86) PCT No.: PCT/CN2017/099392
§ 371 (c)(1),
(2) Date: Nov. 20, 2017

(87) PCT Pub. No.: WO2019/015019
PCT Pub. Date: Jan. 24, 2019

(65) Prior Publication Data
US 2018/0373077 A1 Dec. 27, 2018

(30) Foreign Application Priority Data

Jun. 22, 2017 (CN) .......................... 2017 1 0479326

(51) Int. Cl.
G02F 1/133 (2006.01)
G09G 3/36 (2006.01)
G02F 1/1368 (2006.01)

(52) U.S. Cl.
CPC ........ *G02F 1/13306* (2013.01); *G02F 1/1368* (2013.01); *G09G 3/3696* (2013.01); *G09G 2330/026* (2013.01)

(58) Field of Classification Search
CPC ... G02F 1/13306; G02F 1/368; G09G 3/3696; G09G 2330/026
USPC ........................................................ 327/538
See application file for complete search history.

(56) References Cited

U.S. PATENT DOCUMENTS

| | | | | |
|---|---|---|---|---|
| 7,741,899 B2 * | 6/2010 | Fujiwara | ................. | H02M 3/07 327/536 |
| 8,242,703 B2 * | 8/2012 | Wang | ................. | H05B 33/0815 315/185 S |
| 8,988,084 B2 * | 3/2015 | Schumacher | ....... | B60R 21/0173 324/678 |

* cited by examiner

*Primary Examiner* — Dinh T Le
(74) *Attorney, Agent, or Firm* — Kirton McConkie; Even R. Witt

(57) ABSTRACT

A signal control circuit of a liquid crystal display panel includes a selector, a voltage-dividing module, and a switching transistor. The voltage-dividing module includes a constant current driving sub-module configured to provide a first voltage; and a constant voltage driving sub-module configured to provide a second voltage; the constant current driving sub-module and the constant voltage driving sub-module are selectively activated.

9 Claims, 1 Drawing Sheet

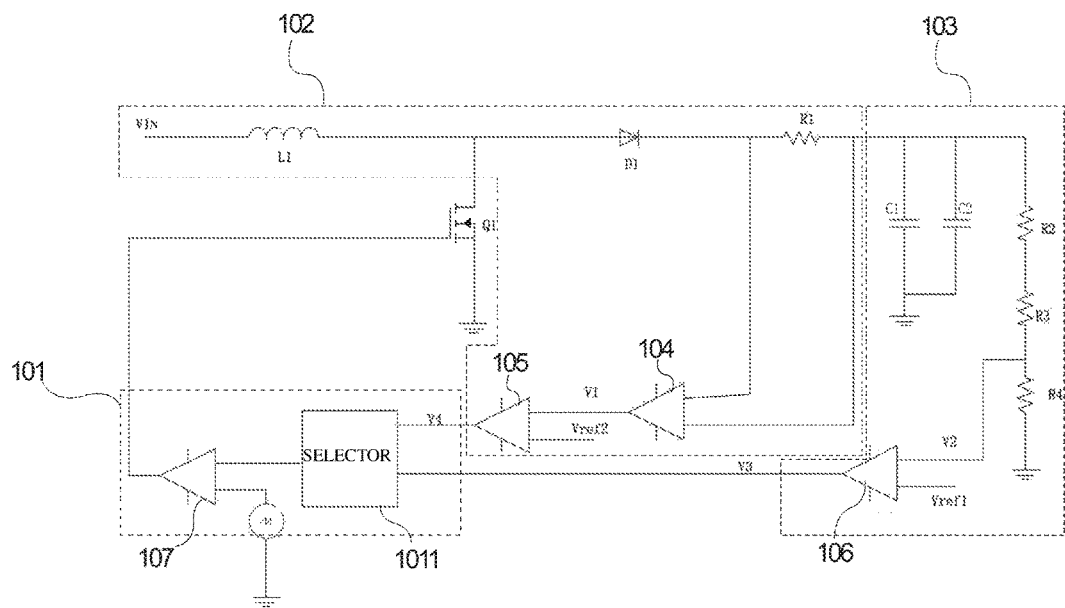

US 10,401,661 B2

METHOD FOR MANUFACTURING METAL WIRE AND ARRAY SUBSTRATE USING THE SAME

BACKGROUND OF INVENTION

Field of the Invention

The present disclosure relates to the technical field of liquid crystal displays, and more particularly to a signal control circuit and a liquid crystal display panel having the signal control circuit.

Description of the Related Art

In the past few years, while liquid crystal display panels are getting larger in size, electric current drawn from each channel in a driving circuit of a liquid crystal display panel is also getting larger, and a proportion of voltage ripple in the driving circuit is specifically restricted as well. Thus, capacitors for regulating voltages are also made larger.

For each capacitor for regulating voltage, each capacitor needs to be charged during booting of a liquid crystal display panel. Because each capacitor has a large capacitance, and each current convertor has not yet reached a predetermined voltage when booting and a duty ratio of signals is relatively small, large electric current is then generated, thereby leading to a sharp increasing of inductive current, causing it to be hard for an output voltage to reach a predetermined value, and resulting in a wrong overcurrent protection for the driving circuit.

In conclusion, in a conventional signal control circuit of a liquid crystal display panel, an inductor of the signal control circuit may generate large electric current at the moment of booting, thereby resulting in an overcurrent protection that causes electric current to be restricted and unable to normally turn on the liquid crystal display panel.

SUMMARY OF THE INVENTION

The present disclosure provides a signal control circuit of a liquid crystal display panel that is able to avoid that the liquid crystal display panel cannot be normally turned on because the overcurrent protection is wrongly started during booting, thereby solving a technical problem existing in a conventional signal control circuit of a liquid crystal display panel where an inductor of the signal control circuit may generate large electric current at the moment of booting, thereby resulting in an overcurrent protection that causes electric current to be restricted and unable to normally turn on the liquid crystal display panel.

In order to solve the foregoing problem, the present disclosure provides a technical solution as follows:

a signal control circuit of a liquid crystal display panel includes a pulse width modulation module, a voltage-dividing module, and a switching transistor;

an input terminal of the voltage-dividing module is connected to receive a control signal; an output terminal of the voltage-dividing module is connected to an input terminal of the pulse width modulation module; the switching transistor is connected between an output terminal of the pulse width modulation module and the input terminal of the voltage-dividing module;

the pulse width modulation module at least includes a selector;

the voltage-dividing module includes:

a constant current driving sub-module configured to provide a first voltage; and a constant voltage driving sub-module configured to provide a second voltage;

a third amplifier is provided between the selector and the switching transistor; a first input terminal of the third amplifier is connected to an output terminal of the selector; a second input terminal of the third amplifier is grounded; an output terminal of the third amplifier is connected to a control terminal of the switching transistor;

the constant current driving sub-module and the constant voltage driving sub-module are selectively activated;

wherein the selector is configured to select the first voltage or the second voltage to control a duty ratio of the switching transistor according to a booting time of the liquid crystal display panel, so as to further selectively activate the constant current driving sub-module or the constant voltage driving sub-module.

According to a preferred embodiment of the present disclosure, the voltage-dividing module further includes a voltage-dividing terminal that is connected to a level converting module.

According to a preferred embodiment of the present disclosure, the constant current driving sub-module includes an inductor, a diode, a first resistor, a subtractor, and a first amplifier that are connected in series; an input terminal of the inductor is connected to receive the control signal;

an input terminal of the first resistor is connected to a first input terminal of the subtractor; an output terminal of the first resistor is connected to a second input terminal of the subtractor; an output terminal of the subtractor is connected to a first input terminal of the first amplifier; a second input terminal of the first amplifier is configured to receive a first reference voltage; an output terminal of the first amplifier is connected to a first input terminal of the selector.

According to a preferred embodiment of the present disclosure, the constant voltage driving sub-module includes a second resistor, a third resistor, a fourth resistor, and a second amplifier that are connected in series;

an input terminal of the second resistor is connected to the output terminal of the first resistor; an output terminal of the fourth resistor is grounded; an output terminal of the third resistor is connected to a first input terminal of the second amplifier; a second input terminal of the second amplifier is configured to receive a second reference voltage; an output terminal of the second amplifier is connected to a second input terminal of the selector.

According to a preferred embodiment of the present disclosure, a first capacitor and a second capacitor are provided between the output terminal of the first resistor and an input terminal of the second resistor; one terminal of the first capacitor and one terminal of the second capacitor are grounded.

The present disclosure further provides a signal control circuit of a liquid crystal display panel includes a pulse width modulation module, a voltage-dividing module, and a switching transistor;

an input terminal of the voltage-dividing module is connected to receive a control signal; an output terminal of the voltage-dividing module is connected to an input terminal of the pulse width modulation module; the switching transistor is connected between an output terminal of the pulse width modulation module and the input terminal of the voltage-dividing module;

the pulse width modulation module at least includes a selector;

the voltage-dividing module includes:

a constant current driving sub-module configured to provide a first voltage; and a constant voltage driving sub-module configured to provide a second voltage;

the constant current driving sub-module and the constant voltage driving sub-module are selectively activated;

the selector is configured to select the first voltage or the second voltage to control a duty ratio of the switching transistor according to a booting time of the liquid crystal display panel, so as to further selectively activate the constant current driving sub-module or the constant voltage driving sub-module.

According to a preferred embodiment of the present disclosure, the voltage-dividing module further includes a voltage-dividing terminal that is connected to a level converting module.

According to a preferred embodiment of the present disclosure, the constant current driving sub-module includes an inductor, a diode, a first resistor, a subtractor, and a first amplifier that are connected in series; an input terminal of the inductor is connected to receive the control signal;

an input terminal of the first resistor is connected to a first input terminal of the subtractor; an output terminal of the first resistor is connected to a second input terminal of the subtractor; an output terminal of the subtractor is connected to a first input terminal of the first amplifier; a second input terminal of the first amplifier is configured to receive a first reference voltage; an output terminal of the first amplifier is connected to a first input terminal of the selector.

According to a preferred embodiment of the present disclosure, the constant voltage driving sub-module includes a second resistor, a third resistor, a fourth resistor, and a second amplifier that are connected in series;

an input terminal of the second resistor is connected to the output terminal of the first resistor; an output terminal of the fourth resistor is grounded; an output terminal of the third resistor is connected to a first input terminal of the second amplifier; a second input terminal of the second amplifier is configured to receive a second reference voltage; an output terminal of the second amplifier is connected to a second input terminal of the selector.

According to a preferred embodiment of the present disclosure, a first capacitor and a second capacitor are provided between the output terminal of the first resistor and an input terminal of the second resistor; one terminal of the first capacitor and one terminal of the second capacitor are grounded.

The present disclosure further provides a liquid crystal display panel including a display panel body and a signal control circuit. The signal control circuit includes a pulse width modulation module, a voltage-dividing module, and a switching transistor;

an input terminal of the voltage-dividing module is connected to receive a control signal; an output terminal of the voltage-dividing module is connected to an input terminal of the pulse width modulation module; the switching transistor is connected between an output terminal of the pulse width modulation module and the input terminal of the voltage-dividing module;

the pulse width modulation module at least includes a selector;

the voltage-dividing module includes:

a constant current driving sub-module configured to provide a first voltage; and a constant voltage driving sub-module configured to provide a second voltage;

the constant current driving sub-module and the constant voltage driving sub-module are selectively activated;

the selector is configured to select the first voltage or the second voltage to control a duty ratio of the switching transistor according to a booting time of the liquid crystal display panel, so as to further selectively activate the constant current driving sub-module or the constant voltage driving sub-module.

According to a preferred embodiment of the present disclosure, the voltage-dividing module further includes a voltage-dividing terminal that is connected to a level converting module.

According to a preferred embodiment of the present disclosure, the constant current driving sub-module includes an inductor, a diode, a first resistor, a subtractor, and a first amplifier that are connected in series; an input terminal of the inductor is connected to receive the control signal;

an input terminal of the first resistor is connected to a first input terminal of the subtractor; an output terminal of the first resistor is connected to a second input terminal of the subtractor; an output terminal of the subtractor is connected to a first input terminal of the first amplifier; a second input terminal of the first amplifier is configured to receive a first reference voltage; an output terminal of the first amplifier is connected to a first input terminal of the selector.

According to a preferred embodiment of the present disclosure, the constant voltage driving sub-module includes a second resistor, a third resistor, a fourth resistor, and a second amplifier that are connected in series;

an input terminal of the second resistor is connected to the output terminal of the first resistor; an output terminal of the fourth resistor is grounded; an output terminal of the third resistor is connected to a first input terminal of the second amplifier; a second input terminal of the second amplifier is configured to receive a second reference voltage; an output terminal of the second amplifier is connected to a second input terminal of the selector.

An advantage of the present disclosure is that:

compared with a conventional signal control circuit of a liquid crystal display panel, the signal control circuit of the present disclosure, by activating a constant current mode during booting, can prevent a booting voltage from being pulled into a protection status that leads to incapability of booting. Thus, a technical problem existing in a conventional signal control circuit of a liquid crystal display panel where an inductor of the signal control circuit may generates large electric current at the moment of booting, thereby resulting in an overcurrent protection that causes electric current to be restricted and unable to normally turn on the liquid crystal display panel is solved.

BRIEF DESCRIPTION OF THE DRAWINGS

In order to explain the technical solutions in the present embodiments or in the prior art more clearly, accompanying drawings required in the description of the present embodiments or prior art will be briefly described. Obviously, accompanying drawings are just some embodiments of the present disclosure, while other drawings may be obtained by those skilled in the art according to these drawings, without making any creative effort.

FIG. 1 is a schematic diagram of a signal control circuit of a liquid crystal display panel according to an embodiment of the present disclosure.

DETAILED DESCRIPTION OF THE PREFERRED EMBODIMENTS

The foregoing objects, features, and advantages adopted by the present disclosure can be best understood by referring to the following detailed description of the preferred embodiments and the accompanying drawings. Furthermore, the directional terms described in the present disclosure, such as upper, lower, front, rear, left, right, inner, outer, side, etc., are only directions referring to the accompanying drawings, so that the used directional terms are used to describe and understand the present disclosure, but the present disclosure is not limited thereto. In the drawings, similar structural units are designated by the same reference numerals.

For a technical problem existing in a conventional signal control circuit of a liquid crystal display panel where an inductor of the signal control circuit may generates large electric current at the moment of booting, thereby resulting in an overcurrent protection that causes electric current to be restricted and unable to normally turn on the liquid crystal display panel, the present embodiment is able to solve the problem.

As shown in FIG. 1, the present disclosure provides a signal control circuit of a liquid crystal display panel. The signal control circuit includes a pulse width modulation module 101, a voltage-dividing module, and a switching transistor Q1. An input terminal of the voltage-dividing module is connected to receive a control signal. An output terminal of the voltage-dividing module is connected to an input terminal of the pulse width modulation module 101. The switching transistor Q1 is connected between an output terminal of the pulse width modulation module 101 and the input terminal of the voltage-dividing module.

The pulse width modulation module 101 includes a selector and an amplifier. The voltage-dividing module includes a constant current driving sub-module 102 and a constant voltage driving sub-module 103.

The constant current driving sub-module 102 includes an inductor L1, a diode D1, a first resistor R1, a subtractor 104, and a first amplifier 105 that are connected in series. An input terminal of the inductor L1 is connected to receive the control signal. An input terminal of the first resistor R1 is connected to a first input terminal of the subtractor 104. An output terminal of the first resistor R1 is connected to a second input terminal of the subtractor 104. An output terminal of the subtractor 104 is connected to a first input terminal of the first amplifier 105. A second input terminal of the first amplifier 105 is configured to receive a first reference voltage Vref1. An output terminal of the first amplifier 105 is connected to a first input terminal of the selector 1011.

After the control signal enters the signal control circuit, electric current is rectified by the inductor L1 and the diode D1 and then enters the first input terminal of the subtractor 104 and the first resistor R1. After going through the first resistor R1, the electric current enters the second input terminal of the subtractor 104, wherein the electric current that passes through the resistor R1 is relatively small. The subtractor 104 receives different electric current with the two input terminals and then outputs a first voltage V1 after calculation. The first voltage V1 enters the first input terminal of the first amplifier 105. The first amplifier 105 outputs a fourth voltage V4 by operating and amplifying based on the first voltage V1 and the first reference voltage Vref1. The fourth voltage then enters the first input terminal of the selector 1011.

The constant voltage driving sub-module 103 includes a second resistor R2, a third resistor R3, a fourth resistor R4, and a second amplifier 106 that are connected in series. An input terminal of the second resistor R2 is connected to the output terminal of the first resistor R1. An output terminal of the fourth resistor R4 is grounded. An output terminal of the third resistor R3 is connected to a first input terminal of the second amplifier 106. A second input terminal of the second amplifier 106 is configured to receive a second reference voltage Vref2. An output terminal of the second amplifier 106 is connected to a second input terminal of the selector 1011.

A first capacitor C1 and a second capacitor C2 are provided between the output terminal of the first resistor R1 and the input terminal of the second resistor R2. One terminal of the first capacitor C1 and one terminal of the second capacitor C2 are grounded.

A third amplifier 107 is provided between the selector 1011 and the switching transistor Q1. A first input terminal of the third amplifier 107 is connected to an output terminal of the selector 1011. A second input terminal of the third amplifier 107 is grounded. An output terminal of the third amplifier 107 is connected to a control terminal of the switching transistor Q1.

After the control signal enters the signal control circuit, electric current orderly passes through the inductor L1, the diode D1, and the first resistor R1 and then charges the first capacitor C1 and the second capacitor C2 so that a voltage gradually increases. The second resistor R2, the third resistor R3, and the fourth resistor R4 constitute a constant-voltage mode. The third resistor R3 outputs a second voltage V2 to the first input terminal of the second amplifier 106. The second amplifier 106 outputs a third voltage V3 to the second input terminal of the selector 1011 by operating and amplifying based on the second voltage V2 and the second reference voltage Vref2.

The selector 1011 receives the fourth voltage V4 output by the constant current driving sub-module 102 and the third voltage V3 output by the constant voltage driving sub-module 103. The selector 1011 selects a voltage according to a booting time for outputting to the third amplifier 107. The third amplifier 107 then outputs a control signal after operation. The control signal determines a duty ratio of the switching transistor Q1, wherein when the duty ratio of the switching transistor Q1 is greater than 50%, the constant current driving sub-module 102 is activated; when the duty ratio of the switching transistor Q1 is lower than 50%, the constant voltage driving sub-module 103 is activated.

For example, a threshold value of the booting time may be set up so that the constant current driving sub-module is selected to be activated before the threshold value of the booting time, or the constant voltage driving sub-module is selected to be activated after the threshold value of the booting time.

When booting, the driving circuit is activated under a constant current driving mode such that the liquid crystal display panel can be booted normally. After booting, the driving circuit changes to a constant current driving mode so as to drive the liquid crystal display panel to display images normally.

A liquid crystal display panel is further provided and comprises a display panel body and a signal control circuit. The signal control circuit includes a pulse width modulation module, a voltage-dividing module, and a switching transistor. An input terminal of the voltage-dividing module is connected to receive a control signal. An output terminal of the voltage-dividing module is connected to an input terminal of the pulse width modulation module. The switching transistor is connected between an output terminal of the pulse width modulation module and the input terminal of the voltage-dividing module. The pulse width modulation module at least includes a selector. The voltage-dividing module includes: a constant current driving sub-module configured to provide a first voltage; and a constant voltage driving sub-module configured to provide a second voltage. The constant current driving sub-module and the constant voltage driving sub-module are selectively activated; wherein the selector is configured to select the first voltage or the second voltage to control a duty ratio of the switching transistor according to a booting time of the liquid crystal display panel, so as to further selectively activate the constant current driving sub-module or the constant voltage driving sub-module.

The working principle of the liquid crystal display panel of the present preferred embodiment is identical to the working principle of the signal control circuit of a liquid crystal display panel of the foregoing preferred embodiment, and therefore it can be specifically referred to the working principle of the signal control circuit of the foregoing preferred embodiment and will not described in detail again to avoid redundancy.

An advantage of the present disclosure is that:

compared with a conventional signal control circuit of a liquid crystal display panel, the signal control circuit of the present disclosure, by activating a constant current mode during booting, can prevent a booting voltage from being pulled into a protection status that leads to incapability of booting. Thus, a technical problem existing in a conventional signal control circuit of a liquid crystal display panel where an inductor of the signal control circuit may generate large electric current at the moment of booting, thereby resulting in an overcurrent protection that causes electric current to be restricted and unable to normally turn on the liquid crystal display panel is solved.

In conclusion, although the present disclosure has been described with reference to the preferred embodiment thereof, it is apparent to those skilled in the art that a variety of modifications and changes may be made without departing from the scope of the present disclosure which is intended to be defined by the appended claims.

What is claimed is:

1. A signal control circuit of a liquid crystal display panel, comprising a pulse width modulation module, a voltage-dividing module, and a switching transistor;
    wherein an input terminal of the voltage-dividing module is connected to receive a control signal; an output terminal of the voltage-dividing module is connected to an input terminal of the pulse width modulation module; the switching transistor is connected between an output terminal of the pulse width modulation module and the input terminal of the voltage-dividing module;
    wherein the pulse width modulation module at least includes a selector;
    wherein the voltage-dividing module includes:
    a constant current driving sub-module configured to provide a first voltage and connected to an input terminal of the selector; and
    a constant voltage driving sub-module configured to provide a second voltage and connected to another input terminal of the selector;
    wherein a third amplifier is provided between the selector and the switching transistor; a first input terminal of the third amplifier is connected to an output terminal of the selector; a second input terminal of the third amplifier is grounded; an output terminal of the third amplifier is connected to a control terminal of the switching transistor;
    wherein the constant current driving sub-module and the constant voltage driving sub-module are selectively activated through the selector;
    wherein the selector is configured to control a duty ratio of the switching transistor according to a booting time of the liquid crystal display panel, so as to further selectively activate the constant current driving sub-module or the constant voltage driving sub-module, wherein the selector is configured to receive a fourth voltage amplified based on the first voltage by the constant current driving sub-module and a third voltage amplified based on the second voltage by the constant voltage driving sub-module and then select a voltage according to the booting time for outputting to the third amplifier; the third amplifier then outputs a signal that determines a duty ratio of the switching transistor, wherein when the duty ratio of the switching transistor Q1 is greater than 50%, the constant current driving sub-module is activated; when the duty ratio of the switching transistor is lower than 50%, the constant voltage driving sub-module is activated.

2. The signal control circuit as claimed in claim 1, wherein the voltage-dividing module further includes a voltage-dividing terminal that is connected to a level converting module.

3. The signal control circuit as claimed in claim 1, wherein the constant current driving sub-module includes an inductor, a diode, a first resistor, a subtractor, and a first amplifier that are connected in series; an input terminal of the inductor is connected to receive the control signal;
    wherein an input terminal of the first resistor is connected to a first input terminal of the subtractor; an output terminal of the first resistor is connected to a second input terminal of the subtractor; an output terminal of the subtractor is connected to a first input terminal of the first amplifier; a second input terminal of the first amplifier is configured to receive a first reference voltage; an output terminal of the first amplifier is connected to a first input terminal of the selector.

4. The signal control circuit as claimed in claim 3, wherein the constant voltage driving sub-module includes a second resistor, a third resistor, a fourth resistor, and a second amplifier that are connected in series;
    wherein an input terminal of the second resistor is connected to the output terminal of the first resistor; an output terminal of the fourth resistor is grounded; an output terminal of the third resistor is connected to a first input terminal of the second amplifier; a second input terminal of the second amplifier is configured to receive a second reference voltage; an output terminal of the second amplifier is connected to a second input terminal of the selector.

5. The signal control circuit as claimed in claim 4, wherein a first capacitor and a second capacitor are provided between the output terminal of the first resistor and the input terminal of the second resistor; one terminal of the first capacitor and one terminal of the second capacitor are grounded.

6. A liquid crystal display panel comprising a display panel body and a signal control circuit, wherein the signal control circuit includes a pulse width modulation module, a voltage-dividing module, and a switching transistor;
    wherein an input terminal of the voltage-dividing module is connected to receive a control signal; an output terminal of the voltage-dividing module is connected to an input terminal of the pulse width modulation module; the switching transistor is connected between an output terminal of the pulse width modulation module and the input terminal of the voltage-dividing module;

wherein the pulse width modulation module at least includes a selector;

wherein the voltage-dividing module includes:

a constant current driving sub-module configured to provide a first voltage and connected to an input terminal of the selector; and a constant voltage driving sub-module configured to provide a second voltage and connected to another input terminal of the selector;

wherein a third amplifier is provided between the selector and the switching transistor; a first input terminal of the third amplifier is connected to an output terminal of the selector; a second input terminal of the third amplifier is grounded; an output terminal of the third amplifier is connected to a control terminal of the switching transistor;

wherein the constant current driving sub-module and the constant voltage driving sub-module are selectively activated through the selector;

wherein the selector is configured to control a duty ratio of the switching transistor according to a booting time of the liquid crystal display panel, so as to further selectively activate the constant current driving sub-module or the constant voltage driving sub-module, wherein the selector is configured to receive a fourth voltage amplified based on the first voltage by the constant current driving sub-module and a third voltage amplified based on the second voltage by the constant voltage driving sub-module and then select a voltage according to the booting time for outputting to the third amplifier; the third amplifier then outputs a signal that determines a duty ratio of the switching transistor, wherein when the duty ratio of the switching transistor Q1 is greater than 50%, the constant current driving sub-module is activated; when the duty ratio of the switching transistor is lower than 50%, the constant voltage driving sub-module is activated.

7. The liquid crystal display panel as claimed in claim 6, wherein the voltage-dividing module further includes a voltage-dividing terminal that is connected to a level converting module.

8. The liquid crystal display panel as claimed in claim 6, wherein the constant current driving sub-module includes an inductor, a diode, a first resistor, a subtractor, and a first amplifier that are connected in series; an input terminal of the inductor is connected to receive the control signal;

wherein an input terminal of the first resistor is connected to a first input terminal of the subtractor; an output terminal of the first resistor is connected to a second input terminal of the subtractor; an output terminal of the subtractor is connected to a first input terminal of the first amplifier; a second input terminal of the first amplifier is configured to receive a first reference voltage; an output terminal of the first amplifier is connected to a first input terminal of the selector.

9. The liquid crystal display panel as claimed in claim 8, wherein the constant voltage driving sub-module includes a second resistor, a third resistor, a fourth resistor, and a second amplifier that are connected in series;

wherein an input terminal of the second resistor is connected to the output terminal of the first resistor; an output terminal of the fourth resistor is grounded; an output terminal of the third resistor is connected to a first input terminal of the second amplifier; a second input terminal of the second amplifier is configured to receive a second reference voltage; an output terminal of the second amplifier is connected to a second input terminal of the selector.

* * * * *

UNITED STATES PATENT AND TRADEMARK OFFICE
CERTIFICATE OF CORRECTION

PATENT NO. : 10,401,661 B2
APPLICATION NO. : 15/575705
DATED : September 3, 2019
INVENTOR(S) : Xianming Zhang Page 1 of 1

It is certified that error appears in the above-identified patent and that said Letters Patent is hereby corrected as shown below:

On the Title Page

Please correct the title item (54) and in the Specification Column 1 Lines 1-3 to read as follows:
--LIQUID CRYSTAL DISPLAY PANEL AND SIGNAL CONTROL CIRCUIT--

Please correct the inventor item (72) to read as follows:
--Xianming Zhang, Shenzhen (CN)--

Please correct the foreign priority claim item (30) to read as follows:
--Jun. 19, 2017 (CN) .................. 201710592138.9--

Signed and Sealed this
Seventeenth Day of March, 2020

Andrei Iancu
*Director of the United States Patent and Trademark Office*